United States Patent [19]

Bales et al.

[11] Patent Number: 5,475,747
[45] Date of Patent: Dec. 12, 1995

[54] TELEPHONE TERMINAL CONTROLLED CONFERENCE INSPECTION

[75] Inventors: Bruce M. Bales, Louisville; Ted M. Fidder, Broomfield; Donald D. Gallagher; Stephen M. Thieler, both of Boulder, all of Colo.

[73] Assignee: AT&T Corp., Murray Holl, N.J.

[21] Appl. No.: 360,530

[22] Filed: Dec. 21, 1994

Related U.S. Application Data

[63] Continuation of Ser. No. 996,350, Dec. 23, 1992, abandoned.

[51] Int. Cl.$^6$ ..................................................... H04M 3/56
[52] U.S. Cl. .......................... 379/201; 379/202; 379/205; 379/206; 379/142; 379/118; 379/127
[58] Field of Search ............................ 379/62, 130, 201, 379/202, 203, 204, 205, 206, 142, 127, 118

[56] References Cited

U.S. PATENT DOCUMENTS

| | | | |
|---|---|---|---|
| 3,912,874 | 10/1975 | Botterell | 379/201 |
| 4,436,963 | 3/1984 | Cottrell et al. | 379/211 |
| 4,546,468 | 10/1985 | Christmas et al. | 370/54 |
| 4,577,065 | 3/1986 | Frey | 379/204 |
| 4,653,090 | 3/1987 | Hayden | 379/204 |
| 4,691,347 | 9/1987 | Stanley | 379/203 |
| 4,719,618 | 1/1988 | Itoh | 370/62 |
| 4,796,293 | 1/1989 | Blinken | 379/130 |
| 4,953,159 | 8/1990 | Hayden | 379/204 |
| 5,020,098 | 5/1991 | Celli | 379/202 |
| 5,195,086 | 3/1993 | Baumgartner | 379/202 |
| 5,373,549 | 12/1994 | Bales et al. | 379/201 |
| 5,386,466 | 1/1995 | Bales et al. | 379/220 |

OTHER PUBLICATIONS

T. Naganawa et al., *A Study of Audio Communication Devices for ISDN*, IEEE Transactions on Consumer Electronics, vol. 36, No. 3, Aug. 1990, New York, US, pp. 753–737.
"Multilink Introduces Multi–Operator Conferencing Systems" Apr. 22, 1991.
"Merlin Pentara 100" 4 British Telecommunictions Engineering p. 121, Jul. 1985.
"Electra Mark II: It Covers Your Markets", Telephony p. 4 Feb. 2, 1987.
"Twin or Clone?" Teleconnect pp. 48–54, Aug. 1987.
"Teleconferencing's Critical Mass: Teetering on the Edge of Universality", Teleconnect p. 148, May 1988.
"Computing Circa 1995", Personal Computing p. 82, May 25, 1990.

*Primary Examiner*—Jeffery A. Hofsass
*Assistant Examiner*—Scott Wolinsky
*Attorney, Agent, or Firm*—John C. Moran

[57] ABSTRACT

A telephone terminal storing conferee identification information received from other telephone terminals on a conference call and responding to actuation of an inspect button to display the identification information of each conferee. As each new telephone terminal is added to the conference call, the new telephone terminal transmits its conferee identification information to the telephone terminals already on the conference call, and those telephone terminals automatically display the identification information of the new conferee. Also, the coordinator of the conference call is so designated when the coordinator's identification information is displayed on one of the telephone terminals.

10 Claims, 8 Drawing Sheets

MESSAGE FLOW

TELEPHONE TERMINAL CONTROLLED CONFERENCE INSPECTION

This application is a continuation of application Ser. No. 07/996,350, filed on Dec. 23, 1992, now abandoned.

TECHNICAL FIELD

This invention relates to telecommunication conference calls, and in particular, to the identification of conferees on a telecommunication conference call by a telephone terminal.

BACKGROUND OF THE INVENTION

In prior art business communication switching systems (also referred to as PBXs), a conference call can be set up between a plurality of telephone stations sets. However, even with a station set that has a single-line alphanumeric display, the users on the conference call can not display the names and telephone number of the other parties on that conference call. If a conferee joins a conference call after the conference call has been established, the joining conferee has no mechanism for establishing who is on the conference call except by asking each of the other conferees to give their names. Similarly, if a conferee drops off of the conference call, without stating that they are dropping off, the other conferees have no way of determining that the conferee has dropped off of the conference call.

Within the AT&T long distance telephone network, a teleconferencing service known as the Alliance Dedicated Teleconferencing Service is available. The Alliance service comprises a teleconferencing bridge connected to a 4ESS toll switch. On the Alliance service, conference calls are set up and controlled by AT&T operators who can obtain a visual display of the individuals on the conference by name and telephone number. In an attempt to improve upon the Alliance service, U.S. Pat. No. 4,796,293 discloses interposing a service computer between a coordinator of a conference call and the Alliance service. The service computer uses the same interface into the Alliance service as that of an AT&T operator terminal. The service computer takes the place of the AT&T operator and gives the coordinator an improved human interface to the Alliance service. In order to establish communication with the service computer, the coordinator is required to use a separate packet data system to establish communication between the service computer and the coordinator's computer terminal. Once this communication has been established, the coordinator has the same capability as the AT&T operator.

The problems in the prior art are (1) the lack of the capability to inspect the identity of the parties on a conference call in business communications switching systems, and (2) the need in the system disclosed by U.S. Pat. No. 4,796,293 for a separate service computer which requires interconnection via a separate packet network. Further, in the case of U.S. Pat. No. 4,796,293, the conference call must begin on a dedicated bridge for which advance reservations are required.

What is needed is a mechanism for a telephone terminal having only a single-line alphanumeric display to be able to step through the identity of each of the conferees on the conference call. In addition, the telephone terminal should control the inspection operation and should receive the identifies of the other conferees using standard telephone protocols without the necessity of having a separate packet network.

SUMMARY OF THE INVENTION

The foregoing problems are solved and a technical advance is achieved by a telephone terminal that stores conferee identification information received from other telephone terminals and is responsive to actuation of an inspect button to display identification information for each conferee. In addition, in an established conference call, as each new conferee is added to the conference call, the telephone terminals of the other conferees automatically display identification information for the new conferee. Also, the coordinator of the conference call is so designated, when identification information for the coordinator is displayed on the telephone terminal. Advantageously, the operations performed by the telephone terminals can be performed by a telecommunication switching system for the telephone terminals.

DETAILED DESCRIPTION

Figure 1:
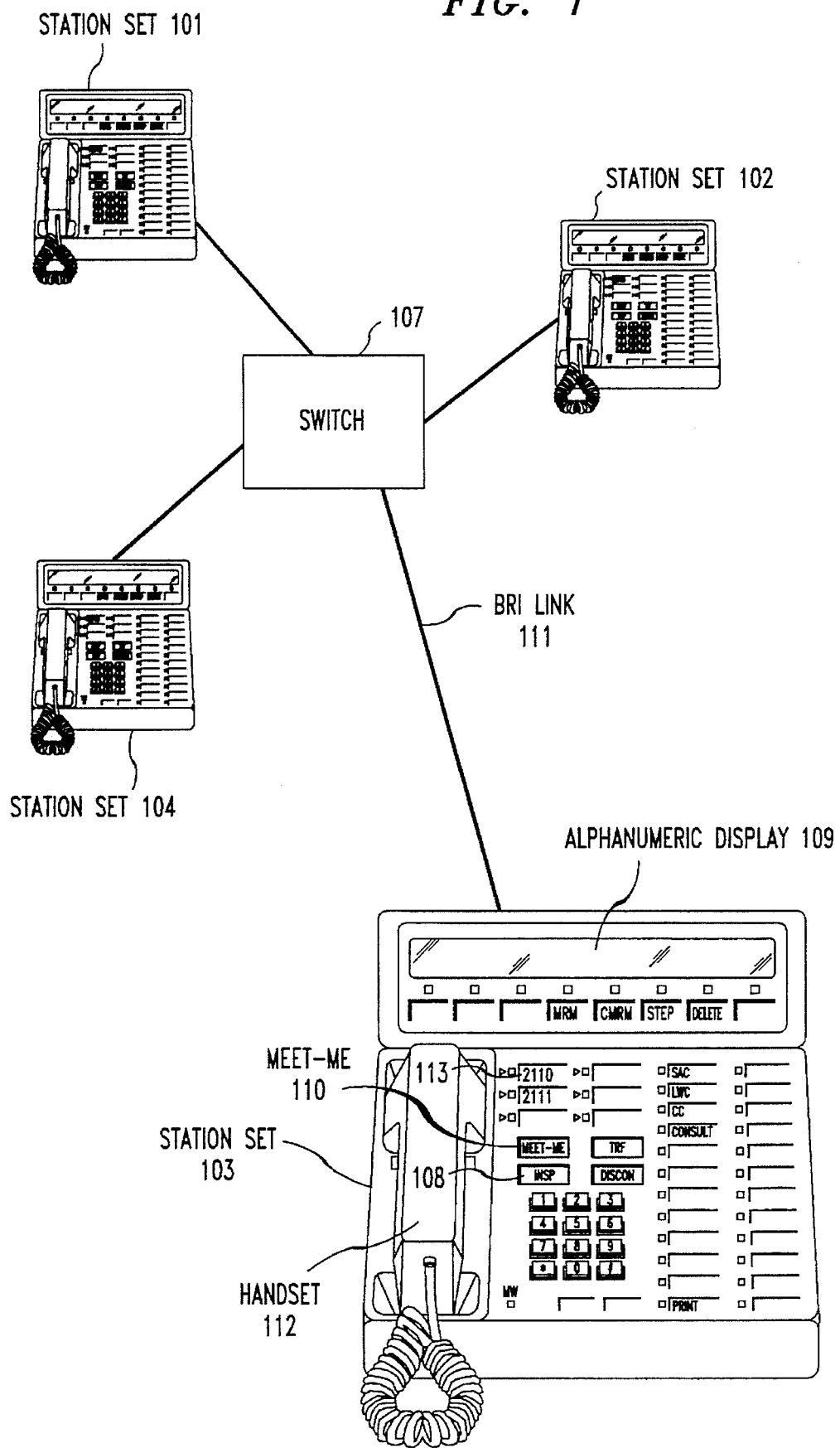
FIG. 1 shows a telecommunication switching system in accordance with the invention.

FIG. 1 illustrates a telecommunication switching system where station sets 101 through 104 are interconnected by switch 107. Stations sets 101,102, and 104 are identical to station set 103 which is illustrated in greater detail. The basic operations of switch 107 and the telephone stations sets are described in further detail in the U.S. patent application of B. M. Bales, et al. entitled "Automatic Initialization of a Distributed Telecommunication System", Case 9-5-5-5, Ser. No. 07/816360, filed on Dec. 30, 1991, now U.S. Pat. No. 5,386,466, and having the same assignee as the present patent application. This patent is hereby incorporated by reference. Both the station sets and the switch implement a conventional OSI model modified to implement the ISDN protocol. As set forth in the above-incorporated patent application, certain modifications have been made to the standard OSI model in order to include ISDN capabilities. Within the software model, there are eight software layers, each of these software layers is described in detail in the above-incorporated patent application. (Note, that the OSI model is also designated as having seven layers where the highest layer combines layers seven and eight of the description in the present application.) The present application is presented in terms of the highest software layer, applications software layer, and assumes the details set forth in the above-incorporated patent application. In addition, the functions performed by the remaining software layers such as system initialization, call routing, and message transmission is also set forth with respect to the above-incorporated patent application.

The present invention is now described by way of an example. This example assumes that station set 101 performs the necessary operations to allow a meet-me-conference call to be set up on switch 107 between station sets 101 and 104 as illustrated in FIG. 1. While the meet-me-conference call is being set up and after station set 103 is added to the conference call, the example describes the information that is displayed on alphanumeric display 109 of station set 103. After the meet-me-conference call is fully established, the example describes how the user of station set 103 can utilize inspect button 108 to sequentially display the identity of the users of the station sets which are on the meet-me-conference call. Station sets 101, 102 and 104 have the same physical layout as station set 103. The other station sets do have different telephone numbers for their line appearances. For example, station set 103 utilizes the telephone number 469-2110 for line appearance 113; whereas, station set 101 uses telephone number 469-2001 for the same line appearance. (Note, that line appearance 113 only has the last four digits of the telephone number written on it.)

As is described in greater detail in latter paragraphs, the user station set 101 initiates the meet-me-conference by actuating the meet-me-conference button (similar to meet-me-conference button 110). The meet-me-conference will be enabled on the active line appearance for telephone number 469-2001 (similar to line appearance button 113). (A line appearance is made active by actuating the button associated with it.) Next, the user of station set 102 originates a call to station set 101 utilizing the 469-2001 telephone number and is added into the meet-me-conference by station set 101. Second, the user of station set 103 originates a call to station set 101 utilizing the 469-2001 telephone number and is added into the meet-me-conference call. Third, the user of station set 104 originates a call to station set 101 using the 469-2001 telephone number and is added into the meet-me-conference call by station set 101. Also, when station set 104 is added into the meet-me-conference call, the user's name and telephone number for station set 104 is displayed on alphanumeric display 109 of station set 103. The same information is displayed on the alphanumeric display of station set 102. Similarly, when station set 103 was added to the meet-me-conference, the user's name and number was displayed on the alphanumeric display of station set 102.

Finally, the user of station set 101 goes off hook and is automatically added to the meet-me-conference call. Again, when station set 101 is added to the meet-me-conference call, the user's name and telephone number for station set 101 is displayed on alphanumeric display 109 of station set 103. The same information is displayed on the alphanumeric displays of station sets 102 and 104.

Figure 3:
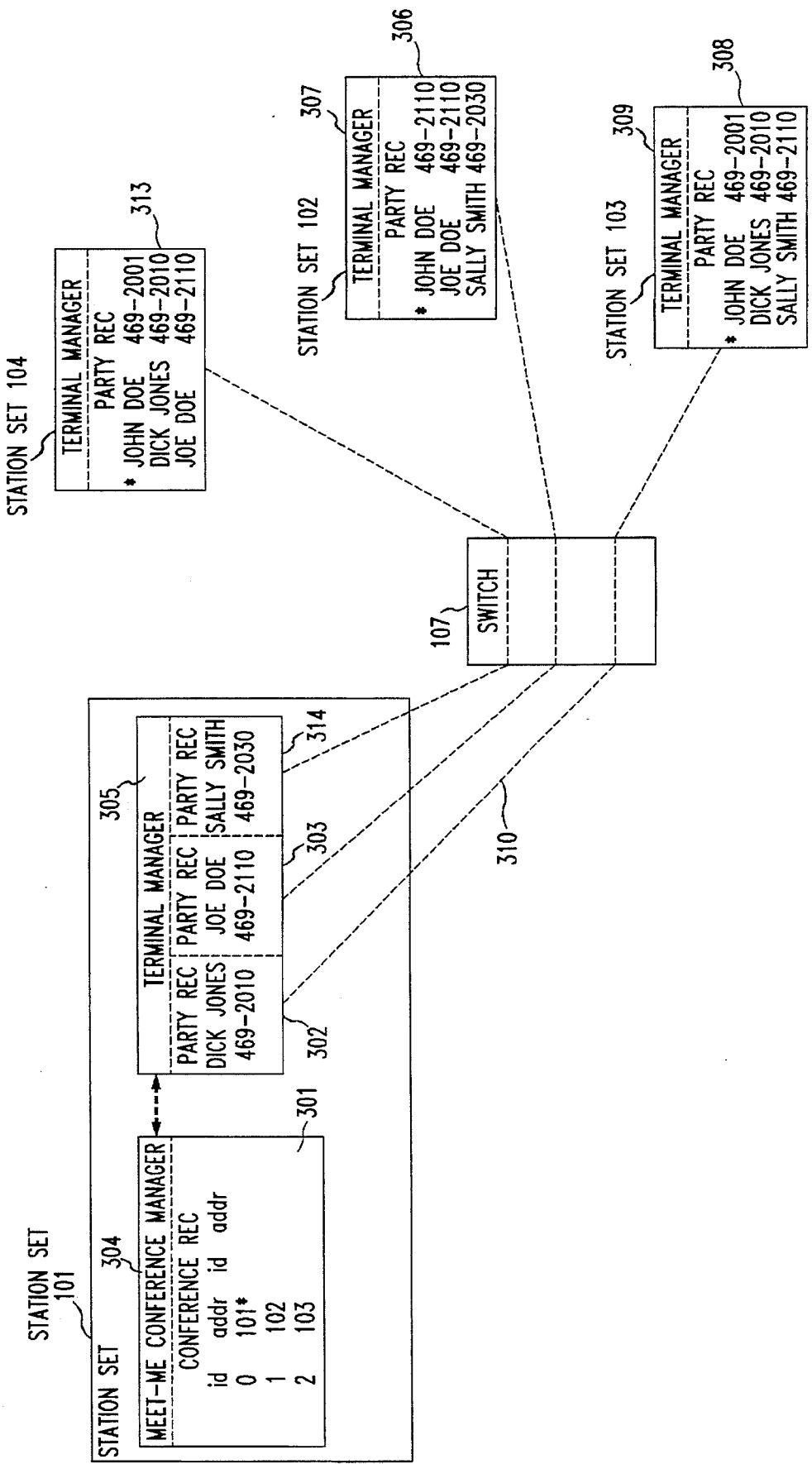
FIG. 3 illustrates the records which are maintained for a meet-me-conference call.

After station sets 101 through 104 are connected to the meet-me-conference call, each of the station sets has stored internally the records illustrated in FIG. 3. The user of station set 103 can sequentially step through the names and the telephone numbers associated with each station set on the meet-me-conference call as stored in party record 308 of FIG. 3 by repeatedly actuating inspect button 108. In the present example, since the coordinator of the conference call, John Doe, was the last person to enter the meet-me-conference call, John Doe's name and number are displayed on alphanumeric display 109. If the user of station set 103 actuates inspection button 108, the name, Dick Jones, and telephone number 469-2010 are displayed on alphanumeric display 109. The next actuation of inspect button 108 results in the name and telephone number of Sally Smith being displayed on alphanumeric display 109. Finally, if inspect button 108 is actuated again, the name and telephone number of John Doe is displayed again on alphanumeric display 109.

Figure 4:
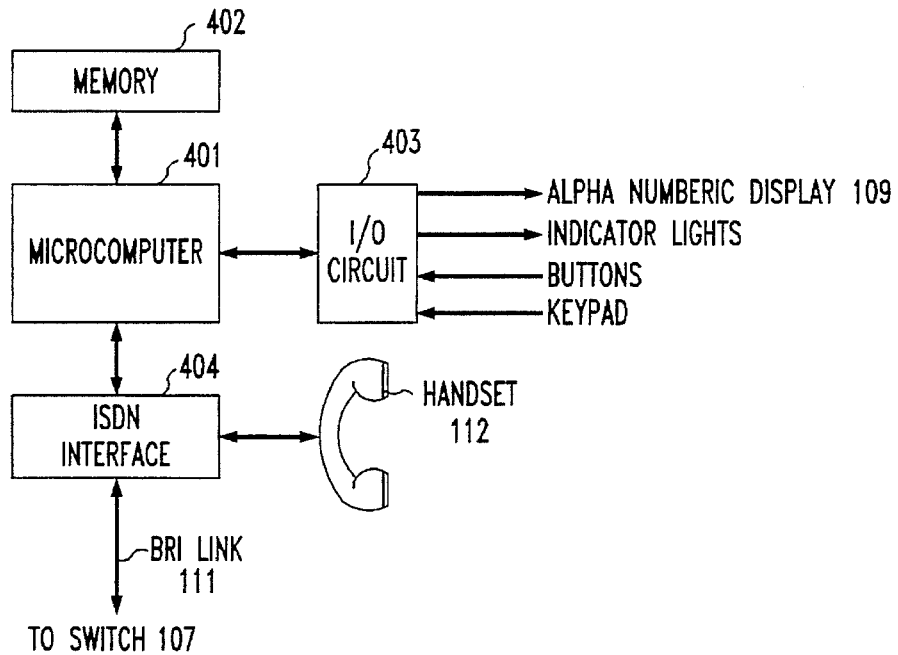
FIG. 4 illustrates, in block diagram form, a telephone station set.

FIG. 4 illustrates, in block diagram form, the internal circuits of station set 103. Station sets 101, 102, and 104 have the same internal structure. ISDN interface 404 implements the physical layer of the OSI model and is one of a number of commercially available ISDN chips. Microcomputer 401 implements the remaining seven layers of OSI model by the execution of programs in memory 402. Specifically, the terminal manager and conference manager applications are stored in memory 402. In addition, the conference records and parties records are also stored in memory 402. Microcomputer 401 controls alphanumeric display 109 and indicator lights on the station set via I/O circuit 403; and microcomputer 401 interrogates the state of the buttons and keypad on the station set via I/O circuit 403. The user of station set 103 utilizes handset 112 to carry on a telephone conversation. Microcomputer 401 can be any number of commercially available microcomputers. In addition, during the autoinitiation sequence which is described in the incorporated patent application, microcomputer 401 in conjunction with ISDN interface 404 executes the autoinitiation functions by executing programs stored in memory 402.

Figure 2:
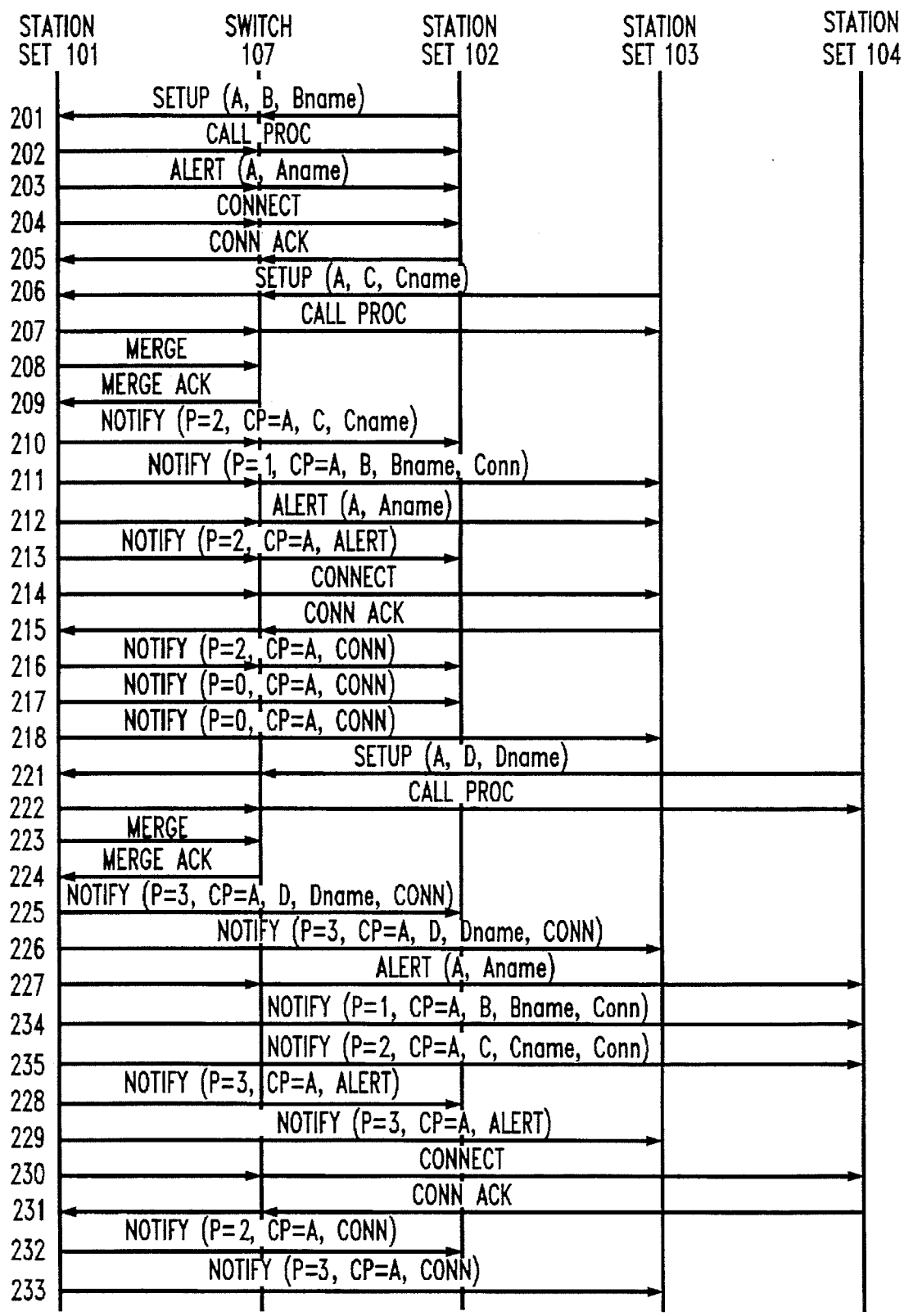
FIG. 2 illustrates the message flow for adding three station sets into a meet-me-conference call.

The meet-me-conference is set up by the message flow illustrated in FIG. 2. Within the message diagrams of FIG. 2, the designations A, B, C, and D, refer to station sets 101, 102, 103, and 104, respectively. Station set 102 first sends a setup message, as illustrated in line 201, to station set 101. The setup message contains the destination which is station set 101, the originator which is station set 102, and includes the alphanumeric name of the user of station set 102. Station set 101 responds in line 202 by transmitting a call proceeding message back to station set 102. Station set 101 then transmits the alerting message back to station set 102 in line 203. The alerting message contains the telephone number (address) and the alphanumeric name of the user of station set 101. Station set 101 does give an audible alerting tone until a predetermined amount of time has elapsed or the user answers. Next, station set 101 transmits back on line 204 a connect message. In the present example, the user of station set 101 has not gone off hook yet. Switch 107 is responsive to the connect message to set up a voice path between station set 101 and station set 102. Station set 102 is responsive to the connect message from station set 101 to transmit back the connection acknowledgment message in line 205.

Station set 103 originates another call to station set 101 in lines 206 and 207. Station set 101 is responsive to the call from station set 103 to invoke a meet-me-conference call. By transmission of the merge message of line 208, station set 101 requests that switch 107 merge the first and the second calls together. The merge function is different than a conference function in that switch 107 only combines the B channels (voice portions) associated with the two calls for transmission to each of the three station sets and not the D channels (signaling portions). The signaling from station sets 102 and 103 is only transmitted to station set 101, which allows station set 101 to retain control of the meet-me-conference. In response to the merge message of line 208, switch 107 performs a merge function and transmits back the merge acknowledgment message of line 209. After receipt of the merge acknowledgment message, station set 101 transmits to station set 102 in line 210 a notify message which informs station set 102 that the second party (P=2, with 2 being the I.D. number) on the conference is station set 103 and that station set 101 is the controlling station set (CP=A). Similarly, station set 101 transmits to station set 103 a notify message in line 211 that informs station set 103 that the first party on the meet-me-conference is station set 102 and provides the name of the user of station set 102 to station set 103. In line 212, station set 101 transmits back an alerting message and provides its station set number as well as the name of the user of station set 101 to station set 103. In addition, station set 101 transmits a notify message to inform station set 102 of the fact that station set 101 is being alerted. Then, station set 101 transmits back the connect message in line 214 to station set 103. Station set 101 also transmits a notify message in line 216 to station set 102 informing it that the second party is now connected. Station set 103 is responsive to the connect message to transmit back the connect acknowledge message in line 215.

After station sets 102 and 103 have entered the meet-me-conference, the user of station set 101 goes off hook on the line appearance and is automatically placed in the meet-me-conference. Note, that the messages of lines 204 and 208 had already added station set 101 to the meet-me-conference. The notify messages of fines 217 and 218 inform station sets 102 and 103 that station set 101 is now a party to the meet-me-conference.

To enter the meet-me-conference, station set 104 transmits the setup message illustrated in line 221 of FIG. 2 to establish a call between station set 101 and station set 104. Station set 101 responds with the call proceeding message of line 222 and the merge message of line 223. Switch 107 is responsive to the merge message to transmit the merge acknowledge message in line 224. Station set 101 informs station sets 102 and 103 that station set 104 is being connected into the meet-me-conference by transmission of the notify messages of lines 225 and 226.

Station set 101 then transmits the alerting message of line 227 to station set 104. Station set 101 transmits the notify messages of lines 234 and 235 to inform station set 104 of the users of station sets 102 and 103, respectively. In addition, station set 101 notifies station sets 102 and 103 that station set 101 is being alerted by lines 228 and 229. Next, station set 101 transmits the connect message to switch 107 and station set 104, and receives the connect acknowledgment message back from switch 107 by the connect acknowledge message of line 231. Station set 104 is now part of the meet-me-conference, and station set 101 transmits the notify messages of lines 232 and 233 to station sets 102 and 103, respectively, to inform these station sets of this fact.

FIG. 3 illustrates the records which have been set up in station sets 101 through 104 in response to the messages of FIG. 2. The records and managers are located at the highest software layer, the application layer, of the software structure of the station sets. As is described in greater detail later, the terminal manager application invokes the meet-me-conference manager application upon actuation of the meet-me-conference button on station set 101. Each terminal manager application maintains a party record for each half of the call in which the terminal manager application is involved. Each party record contains a record of the names of users and addresses (telephone numbers) of the parties on the other half of the call. For example, party records 302, 303, and 314 contain the name and telephone number of the users of station sets 102, 103, and 104, respectively. Station sets 102, 103, and 104 reflect in their party records (306, 308 and 313, respectively) the station set that is the controlling station set and the sub-party station set. In party record 306, the name and telephone number for station set 101 have an asterisk before them denoting the controlling party.

FIG. 3 only illustrates the logical message channels (such as logical channel 310) that are established between the station sets via switches. These logical channels allow the communication of messages between terminal managers. The manner in which these logical channels are established is set forth in the above-incorporated patent application. In addition, the switches are responsive to connect messages to establish voice channels between station sets. The manner in which voice channels are established and terminated is also set forth in the above-incorporated patent application.

Within station set 101, meet-me-conference manager application 304 maintains conference record 301 which maintains the ID numbers utilized to identify the different users on the meet-me-conference call as well as the station set associated with that user. Terminal manager application 305 is responsive to messages related to a meet-me-conference to relay those messages to meet-me-conference manager application 304. These identification numbers were included in the notify messages of FIG. 2. In addition, meet-me-conference manager application 304 can directly access party records 302, 303, and 314, and terminal manager application 305 can directly access conference record 301. In party record 306 of station set 102, station set 101 is designated as controlling the meet-me-conference and station set 103 is designated as being a sub-party.

Station set 102 builds party record 306 in response to the set-up message in line 201 of FIG. 2. Since station set 102 sent the set-up message to station set 101, station set 102 assumes that station set 101 is the master station set if a subsequent conference call is set up. The entry of the name and telephone number of the user of station set 103 into party record 306 occurs when station set 102 receives the notification messages illustrated in lines 210, 213 and 216 of FIG. 2. These three notification messages inform station set 102 that station set 103 is the second party on the meet-me-conference call and give the name and telephone number for station set 103. Party records 308 and 313 in station sets 103 and 104 are built in a similar manner as party record 306.

Figure 5:
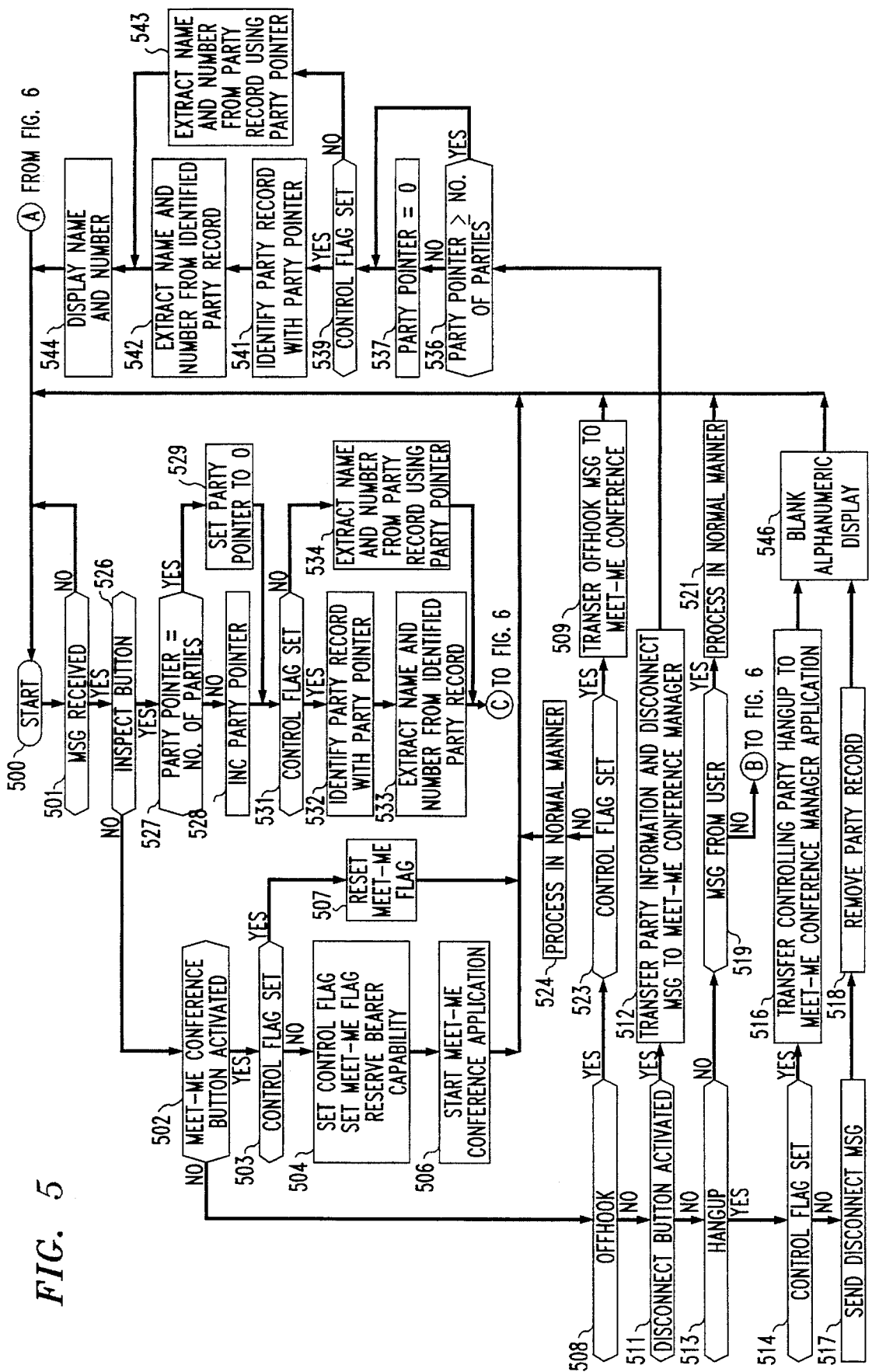
FIGS. 5 and 6 illustrate, in flow chart form, the operations performed by a terminal manager application.
Figure 6:
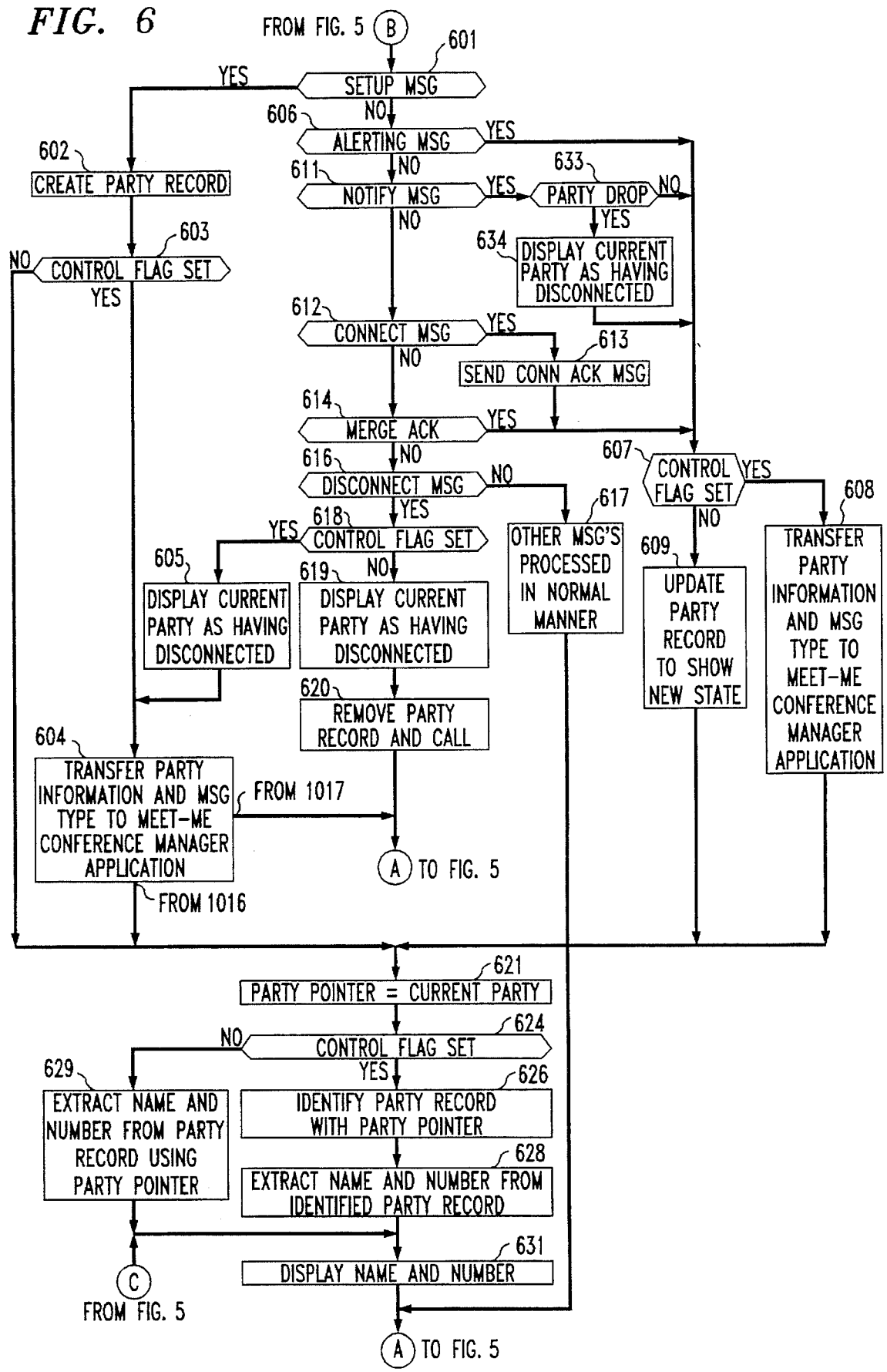

FIGS. 5 and 6 illustrate, in flow chart form, the conference inspection functions performed by terminal manager application 309 of station set 103 of the present example. Also, FIGS. 5 and 6 illustrate how the functions illustrated in message format on FIG. 2 are performed. As previously described, certain of the functions illustrated in FIG. 2 are performed by meet-me-conference manager application 304. The operations of terminal manager application 305 as illustrated in FIGS. 5 and 6 send those functions to conference manager application 304. FIGS. 7 through 11 illustrate, in flow chart form, those functions performed by conference manager application 304. In FIGS. 5 and 6, the "party pointer" is used to display party information, and the "number of parties" stores the total number of people on the meet-me-conference call. Also, in FIGS. 5 and 6, the control flag and the meet-me flag are used to control the meet-me-conference. When the control flag is set on a station set, this indicates that the station set is responsible for controlling the setting up of the meet-me-conference. In the following paragraphs, the controlling station set is station set 101. When the meet-me flag is set, this indicates that other station sets can join the meet-me-conference by calling the designated line appearance; however, when the meet-me flag is reset, this indicates that no more station sets can be added to the meet-me-conference.

In FIG. 5, blocks 500 and 501 wait for a message to be received from another station set, a switch, or an internal message caused by the actuation of a button on this station set. When a message is received, control is transferred from block 501 to decision block 526. The latter decision block determines if the inspection button has been actuated on the station set. If the answer is yes, control is transferred to decision block 527 which determines if the party pointer is pointing to the maximum number of parties on the meet-me-conference call. If the answer is no, block 528 increments the party pointer. However, if the answer is yes, the party pointer is set to the first party in the party record. Next, control is transferred to decision block 531 which checks to see if the control flag is set. In the present example, if the control flag is set, this indicates that station set 101 is executing the program illustrated by the flow chart. If the control flag is not set, then the program is being executed by station set 102, 103, or 104. If the answer to decision block 531 is yes, control is transferred to block 532. From FIG. 3 it can be seen that terminal manager of the controlling station set (station set 101) maintains a unique party record for each station set on the meet-me-conference call. Block 532 identifies the party record associated with the party pointer, and block 533 extracts the name and number from the identified party record. If the answer to decision block 531 was no, then the party pointer is simply used to extract the name and number from party record 308 of station set 103 for example. After the execution of either 533 or 534, control is transferred to block 631 of FIG. 6 where the extracted name and number are displayed on the numerical display of the station set executing the program represented by the flow chart of FIG. 5.

Returning to decision block 526, if the answer is no, control is transferred to decision block 502. The latter decision block determines if the meet-me-conference button has been activated. If that button has been activated, control is transferred to decision block 503, which checks if the control flag is set. If the control flag is not set, control is transferred to block 504 which sets both the control and meet-me flags and reserves bearer capability for the meet-me-conference call. After receiving control from block 504, block 506 then starts the execution of meet-me-conference manager application 304. Returning to decision block 503, if the control flag is set which indicates that this is the second actuation of the meet-me-conference button, control is transferred to block 507. Block 507 resets the meet-me flag resulting in all new incoming calls be excluded from the meet-me-conference. After execution of either block 506 or 507, control is transferred to block 500.

Returning to decision block 502, if the result of this decision is no, control is transferred to decision block 508 which checks if the user of the station set has gone off hook. Recall that station set 101 does not have to be off hook on the line appearance that is being used to establish the meet-me-conference while the other station sets are calling that line appearance to be added into the meet-me-conference. If user of station set 101 does place a call to another station set (for example station set 104) using the line appearance on which the meet-me-conference capability has been established, as station sets 102 and 103 call that line appearance, station sets 102 and 103 are automatically added to the existing call between station sets 101 and 104. However, station set 101 does reserve signaling and bearer capability for when the user does go off hook. If the station set has gone off hook, control is transferred from decision block 508 to decision block 523. If the control flag is not set, decision block 523 transfers control to block 524 which processes the off hook in a normal manner before transferring control to block 500. If the control flag is set, control is transferred to block 509 which in turn invokes meet-me-conference manager application 304. The functions of block 509 with respect to meet-me-conference manager application 304 are given in greater detail in FIG. 7. These functions join the controlling station into the meet-me-conference and transmit notify messages to the other station sets on the meet-me-conference call informing them that the controlling station set is now present on the meet-me-conference call.

Figure 8:
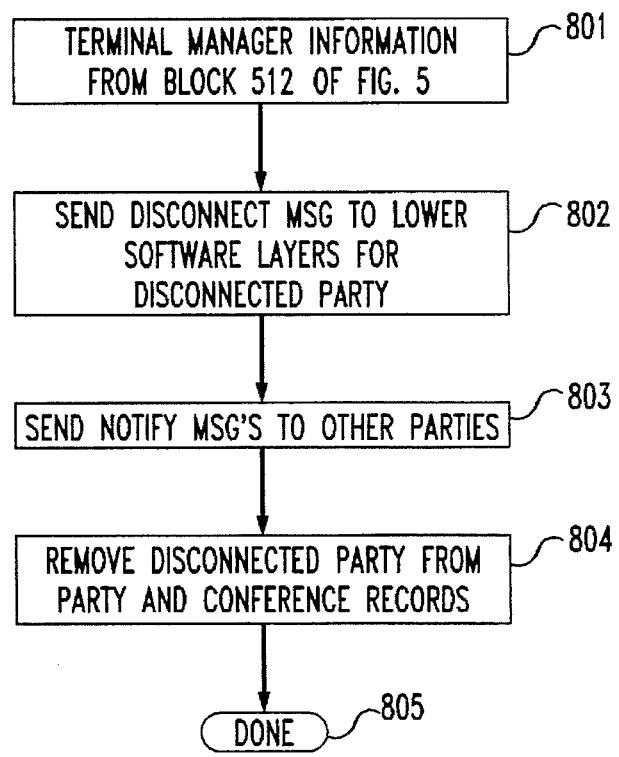

Returning now to decision block 508, if the result of this decision block is no, decision block 511 is executed to determine if the disconnect button has been activated on the station set. If the disconnect button has been activated, block 512 is executed. The functions performed by the meet-me-conference manager application in response to the execution of block 512 are illustrated in FIG. 8. These functions consist of terminating a designated station set from the meet-me-conference call and transmitting notify messages to the remaining station sets informing them that the designated station set has been disconnected. In addition, the meet-me-conference and party records are updated. As part of this updating, the terminal managers in each of the remaining station sets renumber the parties to provide continuous, sequential party numbers. Blocks 536 through 544 display user information for the next sequential party after the disconnected party. If the disconnected party had the highest party number, information on party 0 is displayed.

Returning to decision block 511, if the result is no, control is transferred to decision block 513. The latter decision block determines whether the user of the station set wishes to disconnect from the call. If the answer is yes, control is transferred to decision block 514 which checks to see if the control flag is set indicating that the station set is the controlling station set (station set 101). If the control flag is set, control is transferred to block 516. Block 516 invokes meet-me-conference manager application 304 to perform the functions illustrated in FIG. 9. These functions disconnect all parties from the meet-me-conference and remove party records 302 and 303 and meet-me-conference record 301 as illustrated for station set 101 in FIG. 3. After these functions have been performed by meet-me-conference manager application 304, control is transferred to block 546 of FIG. 5 which blanks the alphanumeric display.

Returning to decision block 514, if the control flag is not set, indicating that the station set is not station set 101 of the present example, control is transferred to block 517 which transmits a disconnect message disconnecting the station set from the meet-me-conference call and transfers control to block 518 which removes the party record associated with the meet-me-conference call. From block 518, control is transferred to block 546.

Blocks 536 through 544 display the name and number of the party pointed to by the party pointer. Decision block 536 determines whether the party pointer is pointing to the last party in the party record. If the answer is yes, the party pointer is set to "0" and control is passed to decision block 539. However, if the answer is no, control is passed to block 539. Decision block 539 determines whether the control flag is set, if the control flag is set, blocks 541 and 542 are utilized to extract the name and number from the party record identified by the party pointer. However, if the answer is no, block 543 is used to extract the name and number of the party identified by the party pointer from the party record. Block 544 displays the extracted name and number on the alphanumeric display of the station set.

Returning to decision block 513, if the result of the decision is no, control is transferred to decision block 519. If it is a message from the user, control is transferred to block 521 which processes this message in a normal manner. If the result of decision block 519 is no, control is transferred to decision block 601 of FIG. 6.

In FIG. 6, if a setup message was received, control is transferred from decision block 601 to block 602 which creates a party record. Next, decision block 603 is executed to determine if the control flag is set, indicating that station set 101 of the present example is executing the terminal manager application. If the control flag is set, block 604 is executed which results in meet-me-conference manager application 304 performing the functions as detailed in FIG. 10. Then control is transferred to block 621 which together with blocks 622 through 631 displays the party information pointed to by the party pointer which is set to the party number (current party) that is assigned by the terminal manager in setting up the party record. If the control flag is not set, control is immediately transferred to block 621 from decision block 603. Note that the transmission of the call proceeding messages of FIG. 2 is performed in a lower software layer.

Returning to decision block 601, if the result of this decision block is no, control is transferred to decision block 606. If the message is an alerting message, decision block 606 transfers control to decision block 607 which determines if the control flag is set. If the control flag is not set, control is transferred to block 609 which updates the party record to show the new state as the alerting state. Block 609 then transfers control to block 621. Returning to decision block 607, if the control flag is set, control is transferred to block 608, which results in meet-me-conference manager application 304 performing the functions illustrated in FIG. 11 before transferring control to block 621.

Returning to decision block 606, if the result of this decision block is no, control is transferred to decision block 611, which checks if the message is a notify message. If the message is a notify message, control is transferred to decision block 633, which checks if the notify message is specifying that the party has disconnected. If the party has disconnected, this fact is displayed by block 634. Regardless of the result of decision block 633, control eventually is transferred to decision block 607, whose functions have already been described.

If the result of decision block 611 is no, control is transferred to decision block 612, which checks if the message is a connect message. If the answer is yes, block 613 is executed, which first sends a connect acknowledgement message back to the station set originating the connect message and then transfers control to decision block 607, whose functions have already been described. If the result of decision block 612 is no, control is transferred to decision block 614, which checks if a merge acknowledge message was received. If the answer is yes, control is transferred to decision block 607, whose functions have been previously described.

If the result obtained by decision block 614 is no, control is transferred to decision block 616, which checks to see if a disconnect message was received. If the answer is no, control is transferred to block 617, which processes all other messages in a normal manner before transferring control to block 500 of FIG. 5 via connector A. If a disconnect message was received, decision block 616 transfers control to decision block 618. If the control flag is set, decision block 618 transfers control to block 605 which displays the current party (party sending disconnect message) as having disconnected and transfers control to block 604, whose functions had been previously described. If the control flag is not set, control is transferred to block 619 which displays the fact that the current party has disconnected on the alphanumeric display. Block 619 then passes control to block 620, which removes the party record.

Blocks 621 through 631 display the name and number of the current party. Block 621 sets the party pointer to the current party which is the party that sent the message. Control is then passed to decision block 624. Decision block 624 determines whether the control flag is set, if the control flag is set, blocks 626 and 628 are utilized to extract the name and number from the party record identified by the party pointer. However, if the answer is no, block 629 is used to extract the name and number of the party identified by the party pointer from the party record. Block 63 1 displays the extracted name and number on the alphanumeric display of the station set.

Figure 7:
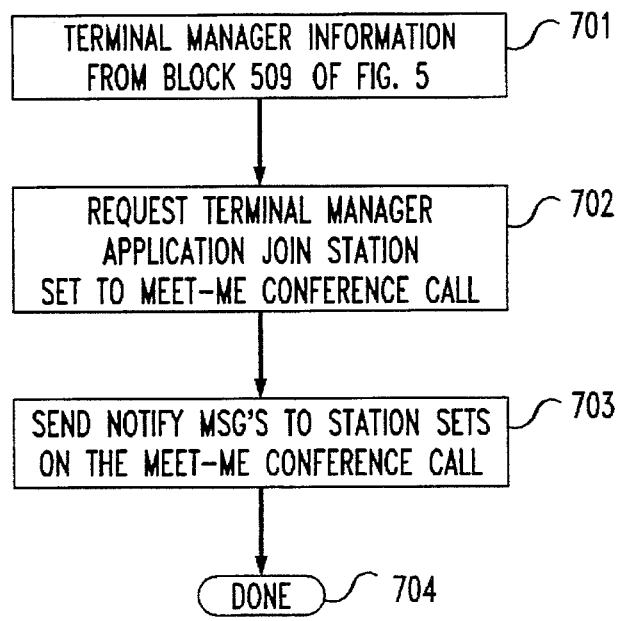

The following is a discussion of the functions performed by meet-me-conference manager application 304 of FIG. 3 as illustrated in FIGS. 7 through 11. FIG. 7 is executed in the present examples when it is determined that the user of station set 101 has gone off hook. Block 702 requests that terminal manager application 305 join the station set into the meet-me-conference call. Recall that the signaling and bearer capabilities had already been reserved for station set 101 to enter the meet-me-conference call by block 504 of FIG. 5. Next, block 703 causes notify messages to be sent to the other station sets on the meet-me-conference call, advising them of the fact that the station set 101 is now part of the meet-me-conference call. Finally, block 704 returns control to terminal manager application 305.

FIG. 8 illustrates the functions performed by meet-me-conference manager application 304 in response to terminal manager application 305 detecting that the disconnect button had been activated. The disconnect button is associated with a particular station set presently on the meet-me-conference call. In the present example, this association is performed by the user of station set 101 displaying that user's name on the alphanumeric display before the disconnect button is activated. Block 802 disconnects that associated station set by transmission of a disconnect message to the lower software layers. Block 803 sends notify messages to the other parties advising them of the fact that the associated station set has been disconnected. Block 804 removes reference to the associated station set from conference record 304 and from the appropriate party record. Finally, block 805 returns control to terminal manager application 305.

Figure 9:
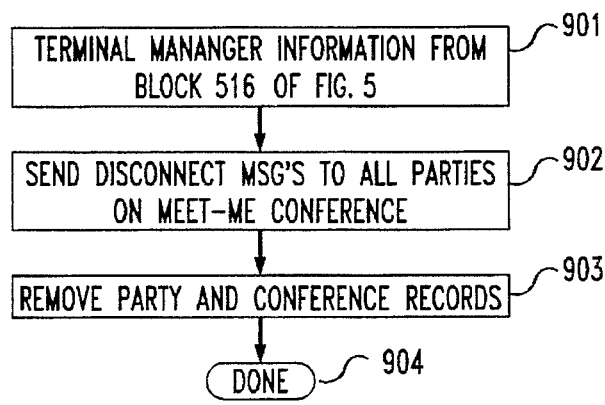

FIG. 9 illustrates the operations performed by meet-me-conference manager application 304 in response to terminal manager 305 detecting that station set 101 has hung up. Block 902 sends disconnect messages to all parties on the meet-me-conference call, and block 903 removes all party and conference records from station set 101 associated with the meet-me-conference call. Finally, block 904 returns control to terminal manager application 305.

Figure 10:
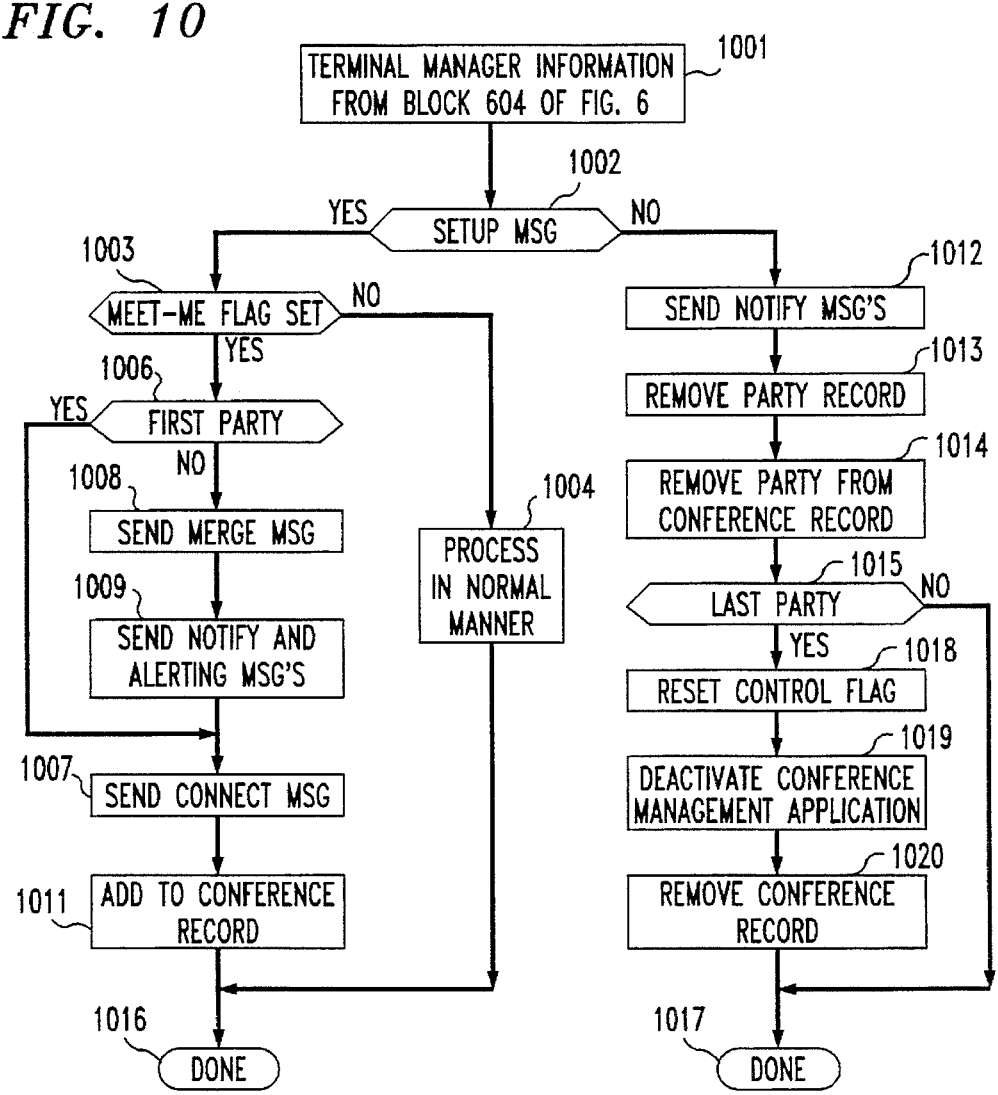

FIG. 10 illustrates the functions performed by meet-me-conference manager application 304 when terminal manager application 305 has detected the receipt of either a setup message or a disconnect message. Decision block 1002 determines whether a setup message has been received and transfers control to decision block 1003 if a setup message was received. Decision block 1003 checks the state of the meet-me flag. If the meet-me flag has been reset, this indicates that no more calls are allowed to join the meet-me-conference call, and the call is processed in a normal manner with respect to another line appearance. If the meet-me flag is set, then the station set transmitting the setup message is allowed to join the meet-me-conference call. If the flag has been reset, block 1004 transmits a busy message to the station set that had transmitted the setup message, unless there is an idle line appearance. If them is an idle line appearance, the call is transferred to that line appearance and is processed in the normal manner. If the meet-me flag is set, control is transferred to decision block 1006. This decision block determines whether the station set is the first party on the call or not. If it is the first party, block 1007 is executed to send a connect message back to the station set. However, if the station set is not the first party, block 1008 sends a merge message to switch 107. Block 1009 transmits notify messages to the other parties on the meet-me-conference call and an alerting message back to the station set originating the setup message. Next, block 1007 is executed. Finally, block 1011 is executed to add the station set originating the setup message to meet-me-conference record 301.

Returning to decision block 1002, if the message is not a setup message, then it must be a disconnect message, and block 1012 is executed which transmits notify messages to the remaining station sets on the meet-me-conference call to inform them that the transmitting station set has dropped off of the call. Block 1013 removes the station set from the appropriate party record and block 1014 removes the references to the party from meet-me-conference record 301. Decision block 1015 determines if the last party has been removed from record 301. If the last party has been removed, blocks 1018, 1019, and 1020, reset the control flag, deactivate the conference management application, and remove the conference record, respectively.

Figure 11:
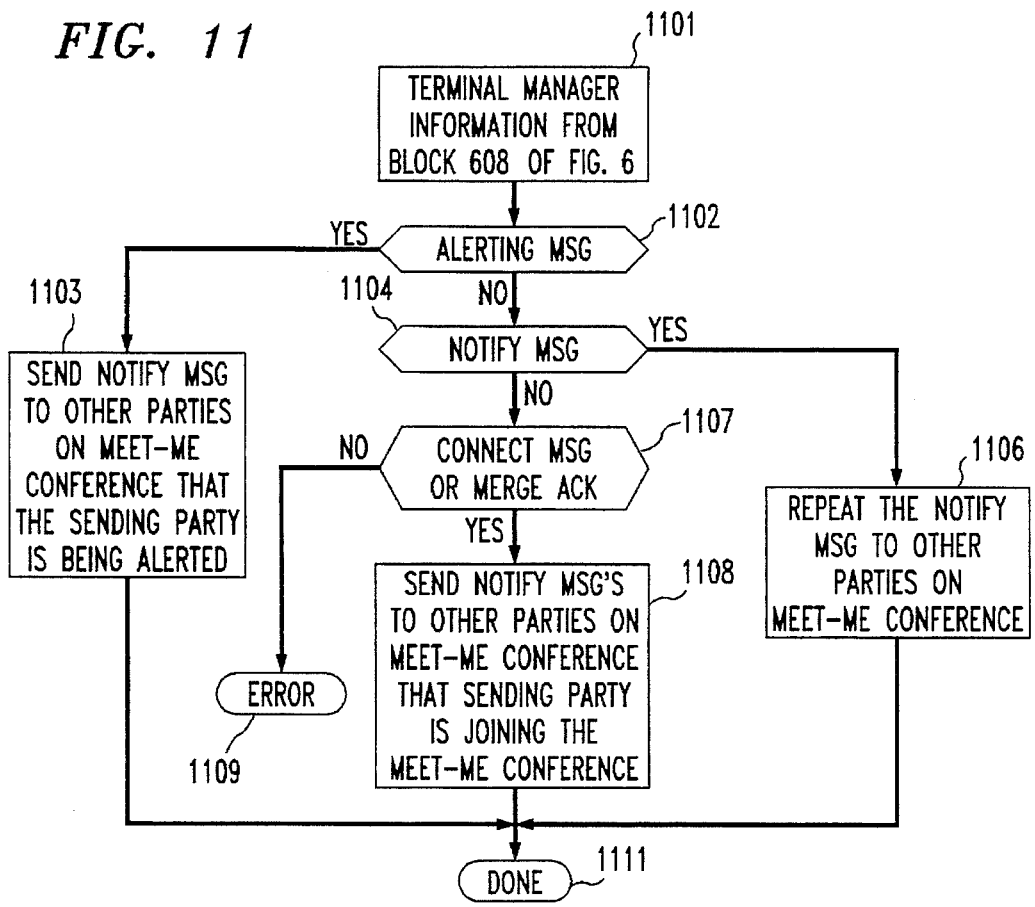
FIGS. 7 through 11 illustrate, in flow chart form, the operations performed by a meet-me-conference manager application.

FIG. 11 illustrates the functions performed by meet-me-conference manager application 304 when terminal manager application 305 has detected an alerting message, notify message, connect message, or merge acknowledge message. If an alerting message has been detected, decision block 1102 transfers control to block 1103. Block 1103 transmits notify messages to the other parties on the meet-me-conference call informing them that the party sending the alerting message is being alerted. If a notify message was detected, decision block 1104 transfers control to block 1106, which simply repeats the notify message to the other parties on the meet-me-conference call. If either a connect or merge acknowledge message was detected, block 1108 sends notify messages to the other parties on the meet-me-conference call, informing them that the sending party is joining the meet-me-conference call. Finally, block 1111 transfers control back to terminal manager application 305.

Although the conference inspection has been described with respect to a meet-me-conference, one skilled in the art could readily apply it to other types of conferences.

The present embodiment discloses displaying user information for the most recently added station set on the alphanumeric displays of the other active station sets on the conference. An alternate embodiment would only display the number of parties on the conference on the alphanumeric displays as a party was added, and the parties would have to use the inspection button to obtain user information.

Further, it would be apparent to one skilled in the art that the meet-me-conference manager and terminal manager programs could be executed for each individual station set by a switching node.

We claim:

1. A method for identifying conferees of a telecommunication conference having a plurality of telephone terminals with only one of the telephone terminals controlling the conference, comprising the steps of:

entering the conference by each telephone terminal;

sending an identification by each telephone terminal upon entering the conference to the controlling telephone terminal;

transmitting by the controlling telephone terminal the identification received from each telephone terminal as each enters the conference to telephone terminals already on the conference;

storing the transmitted identification of each telephone terminal as each enters the conference by the telephone terminals already on the conference;

transmitting identifications of the telephone terminals already on the conference to each telephone terminal as each enters the conference;

storing the identification received from each telephone terminal as each enters the conference by the controlling telephone terminal;

storing by each of the telephone terminals as each enters the conference the identifications of telephone terminals already on the conference received from the controlling telephone terminal; and displaying the stored identifications by each telephone terminal in response to an act of a user of the telephone terminal.

2. The method of claim 1 wherein the identification of each telephone terminal as each enters the conference comprises a telephone number and a name assigned to the telephone terminal.

3. The method of claim 1 wherein the act of the user is an actuation of a switch.

4. The method of claim 3 wherein the step of transmitting identifications of the telephone terminals already on the conference further comprises the steps of transmitting the identification of the controlling telephone terminal; and designating in the identification of the controlling telephone terminal that the controlling telephone terminal is controlling the conference.

5. The method of claim 4 wherein the step of displaying further comprises the step of indicating that the controlling telephone terminal is controlling the conference when displaying the stored identifications.

6. A conference system for identifying conferees of a telecommunication conference having a plurality of telephone terminals with only one of the telephone terminals controlling the conference, comprising:

means for entering the conference by each telephone terminal;

means for sending an identification by each telephone terminal upon entering the conference to the controlling telephone terminal;

means for transmitting by the controlling telephone terminal the identification received from each telephone terminal as each enters the conference to telephone terminals already on the conference;

means in each of the telephone terminals already on the conference for storing the transmitted identification of each telephone terminal as each enters the conference;

means for transmitting identifications of the telephone terminals already on the conference to each telephone terminal as each enters the conference;

means for storing the identification received from each telephone terminal as each enters the conference by the controlling telephone terminal;

means for storing by each telephone terminal as each enters the conference the identifications of the telephone terminals already on the conference received from the controlling telephone terminal; and means for displaying the stored identifications by each telephone terminal in response to an act of a user of the telephone terminal.

7. The conference system of claim 6 wherein the identification of each telephone terminal as each enters the conference comprises a telephone number and a name assigned to the telephone terminal.

8. The conference system of claim 6 wherein the act of the user is an actuation of a switch.

9. The conference system of claim 8 wherein the means for transmitting identifications of the telephone terminals already on the conference further comprises means for transmitting the identification of the controlling telephone terminal; and means for designating in the identification of the controlling telephone terminal that the controlling telephone terminal is controlling the conference.

10. The conference system of claim 9 wherein the displaying means further comprises means for indicating that the controlling telephone terminal is controlling the conference in response to the designation in the identification of the controlling telephone terminal.

* * * * *